April 28, 1936. H. WILLSHAW ET AL 2,038,880
APPARATUS FOR TESTING EXTENSIBLE MATERIAL
Filed Feb. 20, 1934 6 Sheets-Sheet 2
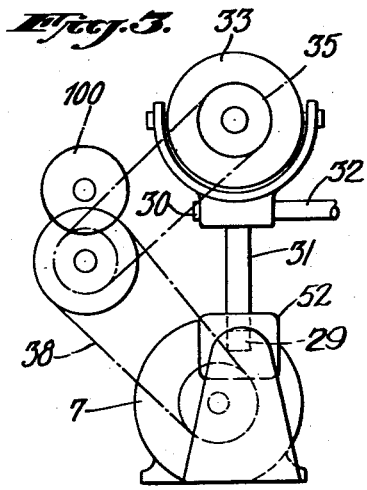
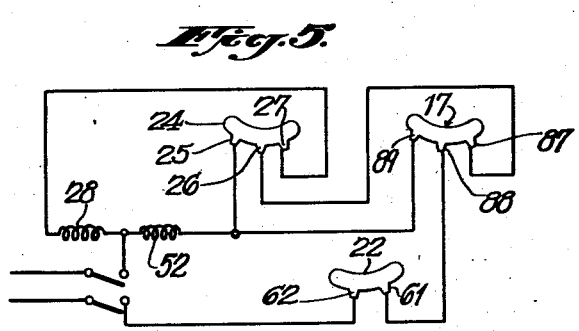
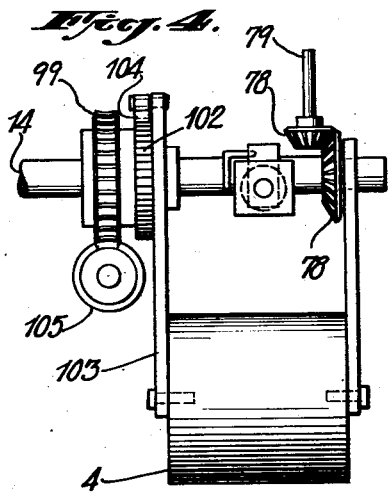
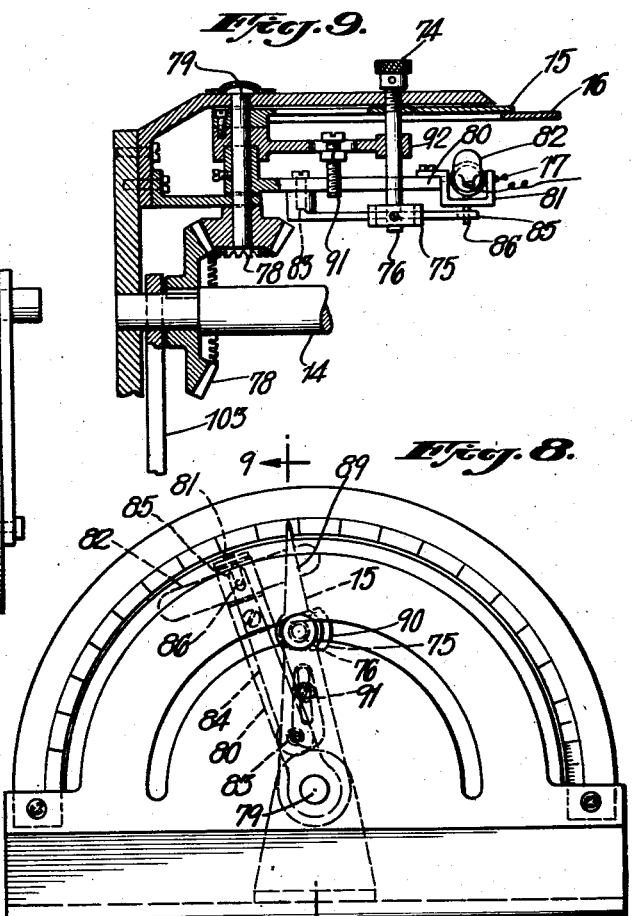
INVENTORS
HARRY WILLSHAW.
GEOFFEREY C. BRENTNALL.
BY
ATTORNEYS

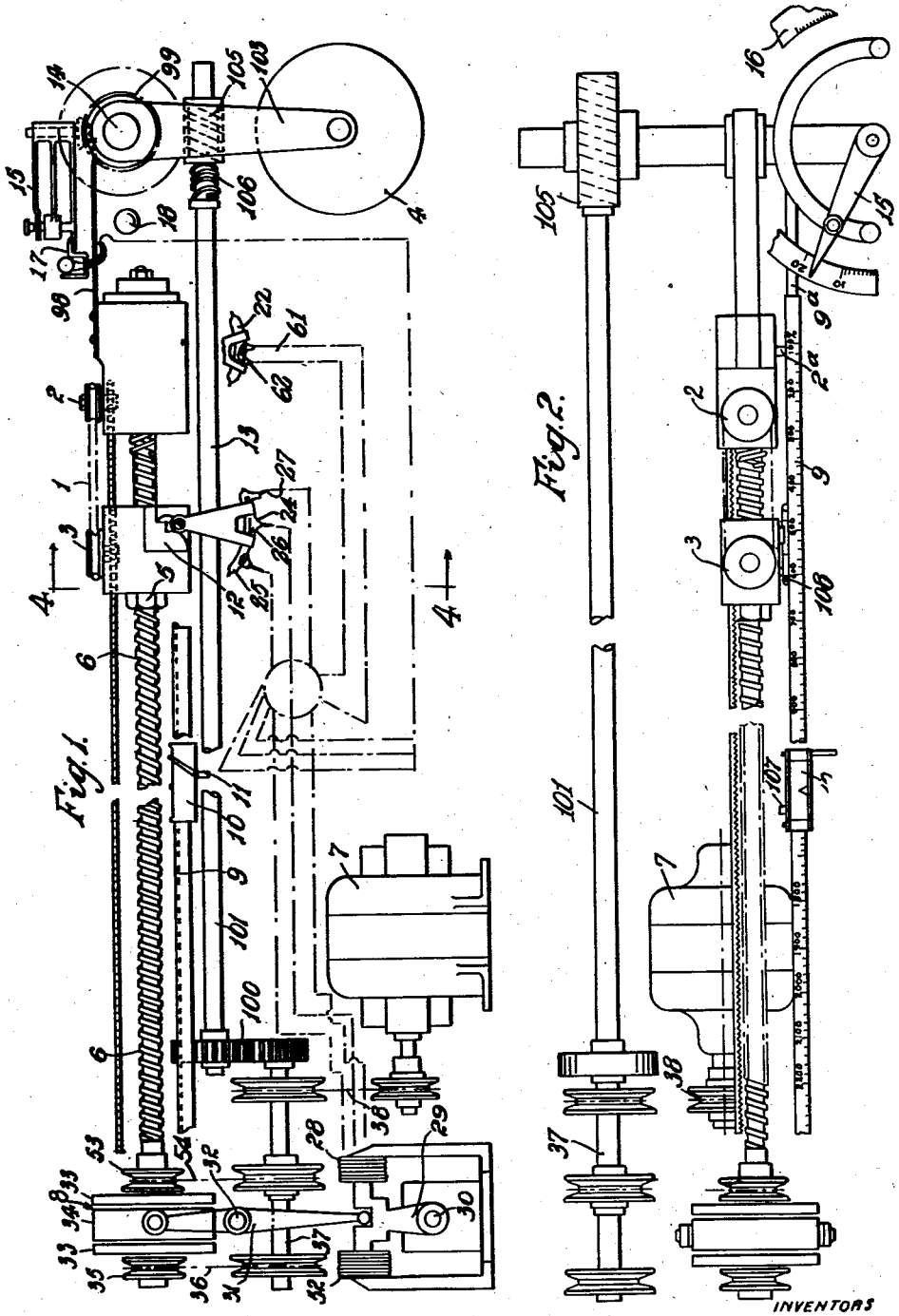

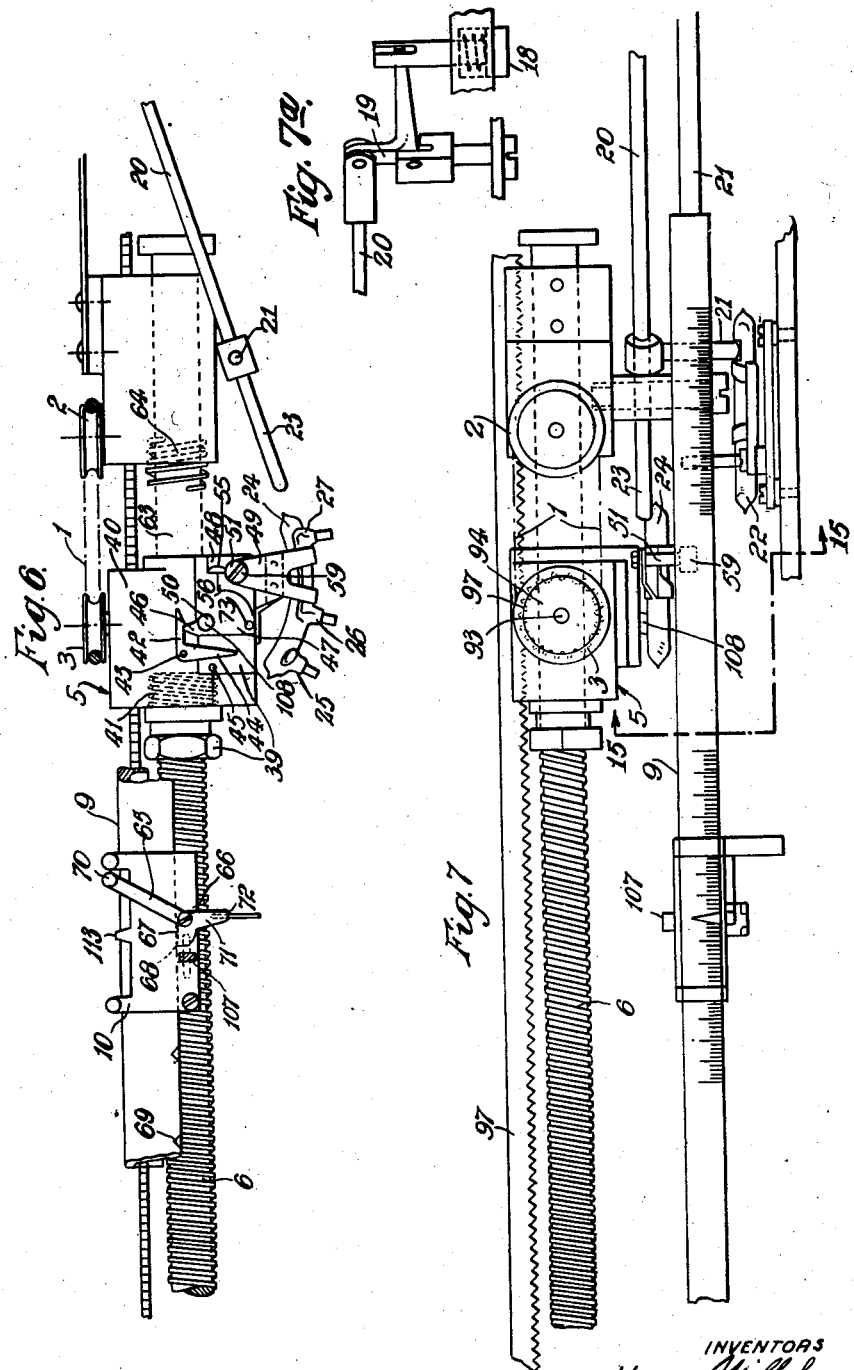

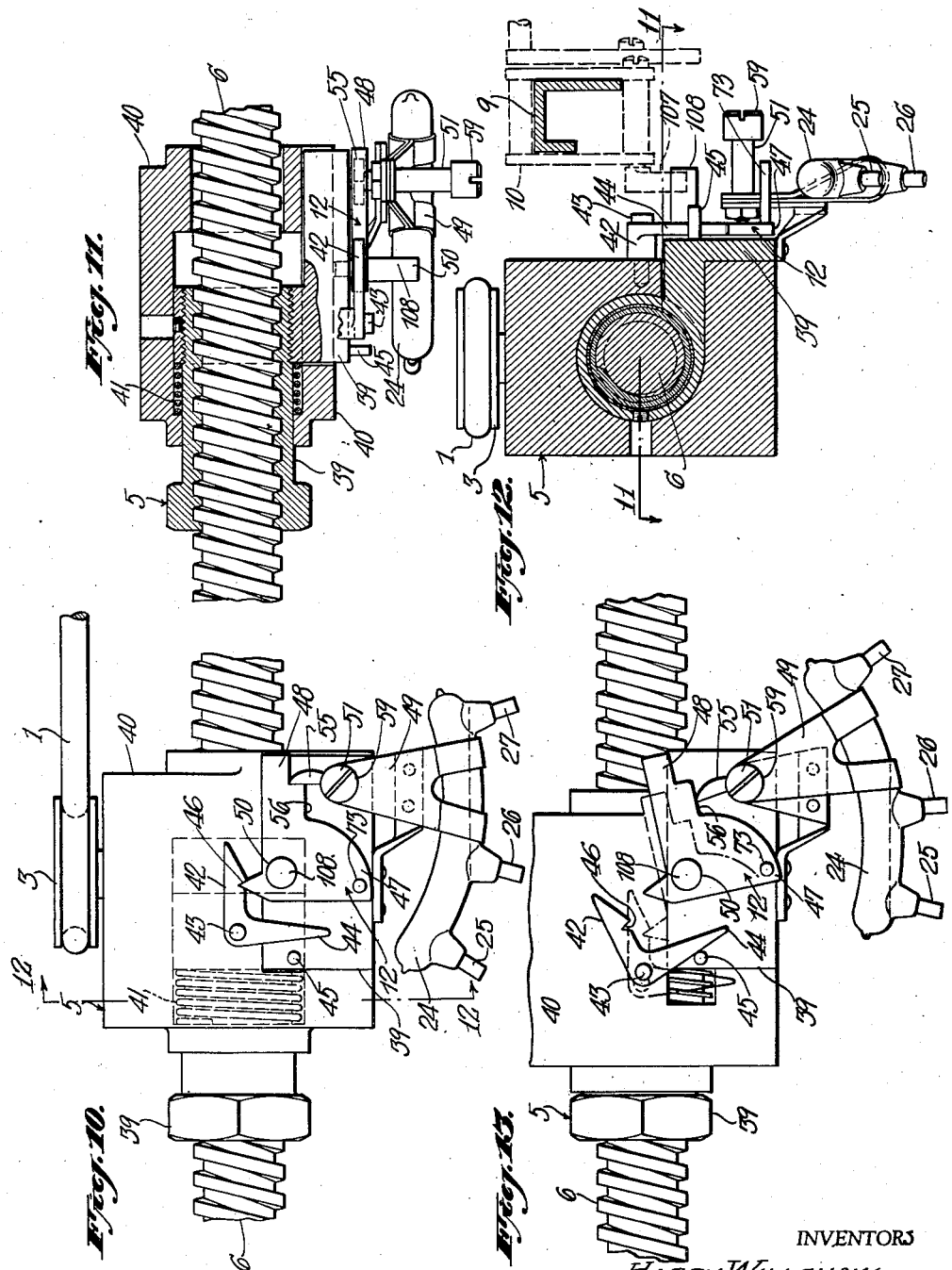

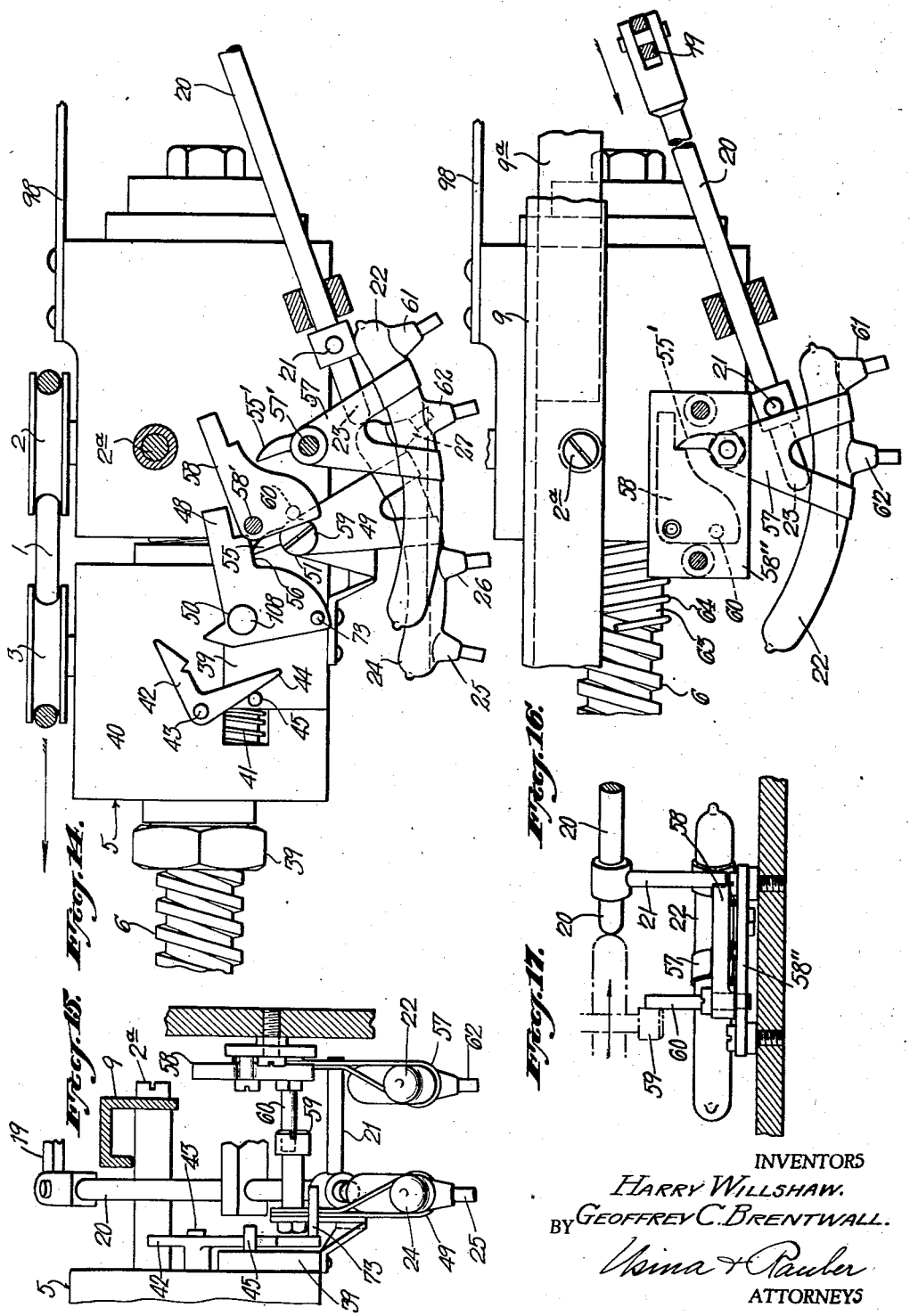

April 28, 1936.  H. WILLSHAW ET AL  2,038,880
APPARATUS FOR TESTING EXTENSIBLE MATERIAL
Filed Feb. 20, 1934   6 Sheets-Sheet 6
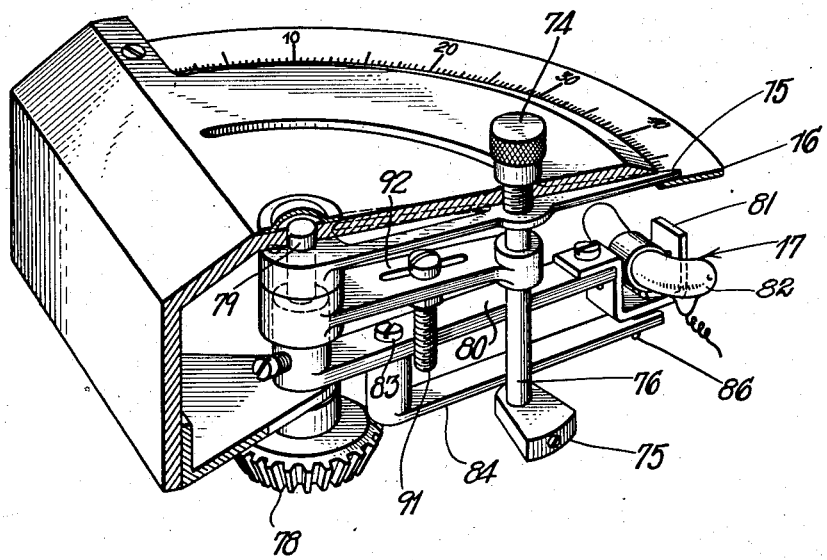
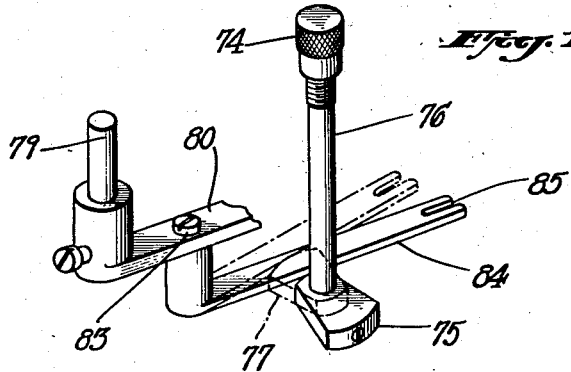
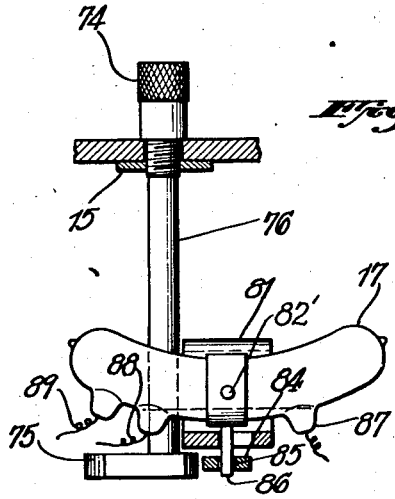
INVENTORS
HARRY WILLSHAW.
GEOFFEREY C. BRENTNALL.
BY
ATTORNEYS Patented Apr. 28, 1936

2,038,880

UNITED STATES PATENT OFFICE 2,038,880

APPARATUS FOR TESTING EXTENSIBLE MATERIAL

Harry Willshaw, Wylde Green, and Geoffrey Charles Brentnall, Erdington, Birmingham, England, assignors to Dunlop Rubber Company Limited, Birmingham, England, a British corporation Application February 20, 1934, Serial No. 712,118
In Great Britain February 22, 1933

8 Claims. (Cl. 265—12)

Our invention relates to apparatus for testing extensible material. It is applicable especially to the testing of rings particularly of rubber, but it is not limited thereto as it may also be applied to the testing of threads and yarns for example.

An object of the invention is to provide testing apparatus of the above type that is automatic in operation.

According to our invention, the apparatus is adapted to be power driven and is characterized in this, that said material is stretched by means of which the stretching movement is adapted to be automatically stopped at any of the following points viz. (a) when the test piece breaks, (b) at a given elongation, (c) at a given load.

Preferably, said movement of the stretching means is adapted to be automatically reversed at any of said points so that said means return to the starting position, and provision may also be made whereby the drive to said means is automatically stopped altogether at a predetermined point, for example, upon return of said means to the starting point.

Another object of our invention is to provide means adapted automatically to give and hold an indication of any of the following factors viz. (a) load and elongation at break, (b) load at a given elongation, (c) elongation at a given load.

Other objects and features of our invention, such as to provide means for the rotation of the test ring and for lowering the weight against which said ring pulls, will become apparent as the description proceeds.

The various features of our invention are illustrated by way of example and without intention in any way to limit the scope of said invention in the accompanying drawings which show apparatus for testing rubber rings and in which—

Fig. 1 is a side view of the apparatus, the supporting structure which may be of any suitable framework being omitted for the sake of clearness in this and the other views; Fig. 2 is a plan view thereof; Fig. 3 is an end view of the apparatus taken from the left of Fig. 1; Fig. 4 is a vertical cross section of the apparatus taken on line 4—4 of Fig. 1; Fig. 5 is a circuit diagram of the electrical system; Fig. 6 is a part side view showing certain of the mechanisms in more detail; Fig. 7 is a plan view of the apparatus shown in Fig. 6; Fig. 7a is a plan view of elements at the right of those of Fig. 7 and positioned to be actuated thereby; Fig. 8 is a detail plan view taken on line 8—8 of Fig. 9 showing certain other mechanisms; Fig. 9 is a section of the apparatus taken on line 9—9 of Fig. 8.

Fig. 10 is a side view in detail of the mechanism for controlling the stopping of a movable element of the testing apparatus; Fig. 11 is a longitudinal section taken on line 11—11 of Fig. 12; Fig. 12 is a cross-section of the apparatus taken on line 12—12 of Fig. 10; Fig. 13 is a view similar to that of Fig. 10 showing the apparatus with certain parts displaced to different position; Fig. 14 is a similar view showing the movable element moved toward the non-movable element; Fig. 15 is a cross-sectional view of certain switch elements taken on line 15—15 of Fig. 7; Fig. 16 is a side view and Fig. 17 is a plan view of one of the switch elements; Fig. 18 is a perspective view of the indicating mechanism shown in Figs. 8 and 9; Fig. 19 is a detail perspective view of a part of the mechanism shown in Fig. 18 and Fig. 20 is a sectional elevation of a mercury switch and connections forming a part of the mechanism shown in Figs. 8 and 9.

The test ring 1 is positioned round a pair of small bollards 2 and 3 of which one, the bollard 2, hereinafter called the weighted bollard, is connected as hereinafter described, to a liftable weight 4. The other bollard 3, hereinafter called the moving bollard, connects, through a nut 5, hereinafter called the bollard nut, with a rotatable screwed shaft 6 whereby said moving bollard 3 can be moved away from its fellow so as to stretch the test ring 1.

This screwed shaft 6 is driven by an electric motor 7 the rotation of said shaft being reversible by a double-sided clutch 8 operating to select the drive required, as hereinafter set out.

Flanking the shaft is a scale 9, Fig. 2, hereinafter called the elongation scale graduated in terms of elongation—e. g. % stretch—and on the scale is a slidable cursor 10 fixable on said scale. The scale itself is slidable on its support 9a and moves commonly with the weighted bollard 2 to which it is permanently fixed by a stud 2a.

The cursor 10 carries trip mechanism 11, Fig. 1, hereinafter called the cursor trip, which can be set to coact with further trip mechanism 12, hereinafter called the bollard nut trip carried by the bollard nut 5, when the latter slides to the position at which the trip 11 has been set.

The bollard nut trip mechanism acts also in other ways being in effect in three parts viz, a part which coacts with the cursor in connection with elongation tests, a part which acts independently—in connection with breakage tests, and a part which coacts with a further trip 13, hereinafter called the stopping trip, which stopping trip is carried by the framework of the apparatus and functions finally to stop the motion of the apparatus entirely.

The weight 4 hangs on a rotatable shaft 14, hereinafter called the weight shaft connected to swing upwardly by the movement of the weighted bollard 2 as the same is pulled by the test ring. Said swinging motion is transmitted by bevel gears 78 (Figs. 4 and 9) hereinafter described to a pointer 15 rotatably mounted on the shaft 79 and movable over a scale 16, Figs. 2, 9 and 18 hereinafter called the load scale graduated in terms of load—e. g. kilogrammes tension.

Said pointer is also fixable on said scale and adapted to control trip mechanism 17, Figs. 1, 18 and 20, hereinafter called the load trip, also operated from the weight shaft, as hereinafter set out.

The description and numerals used so far will serve to give a general indication of the disposition of the various parts on the general arrangement drawings, viz, Figures 1 to 4 inclusive. The precise construction, arrangement and function of these mechanisms will be better understood from the following description of the three main tests which we use, described particularly in connection with the detail drawings numbered suitably to meet the more precise description.

Suppose it is desired to carry out a test to break and to indicate the elongation and load thereat: the cursor 10 and the pointer 15 are both free on their respective scales, the cursor trip 11 and the load trip 17 taking no part in this test.

The apparatus is set in motion by pressing a push button 18 near the shaft 14, Fig. 1, which rocks a bell crank lever 19 which displaces a rod 20 to do two things viz: the side or branch extension 21, Fig. 7, of said rod engages and tilts into starting position a mercury switch 22, Figs. 7 and 14–17, hereinafter called the stopping and starting switch, to energize the electrical circuit, Fig. 5, and whereby the various motions are controlled; and the direct extension 23 of said rod 20 tilts a further mercury switch 24, hereinafter called the cursor switch, which sets the cursor travelling forward as follows:—

The tilting of the switch 24 causes the mercury to flow out of the contact 25—26 into the contact 26—27 and this makes a circuit to energize a solenoid 28 which rocks a lever 29, Fig. 1, on a pivot 30 which in turn rocks a yoke 31 on a pivot 32 which causes the face 33 of the central member 34 of the friction clutch 8, slidably keyed on the shaft 6, operatively to engage a pulley 35 continuously rotating on said shaft, said pulley being driven by an open belt 36 from a countershaft 37 driven by a belt 38 from the motor 7.

Engagement of the pulley 35 with the clutch 8 in this way puts the screwed shaft 6 into forward operating coaction with the drive, and so said shaft rotates and thereby progresses the moving bollard 3 away from the weighted bollard 2.

As the test ring 1 extends, the bollard nut 5 meets the cursor 10 as described later and pushes it along the elongation scale 9 while the pointer 15 moves round the load scale 16, also as described later, under the influence of the pull exerted on the weighted bollard 2 by the test ring.

These motions proceed until the ring breaks and then that part of the bollard nut trip which acts independently in connection with breaking tests, held until now, as described later, by the pull of the ring operates as follows:—

The bollard nut, Fig. 6, is in two parts 39 and 40, the part 39 engaging the threads of the shaft 6 while part 40, which carries the bollard 3, is slidable to some extent on part 39. Operating between the two said parts, there is a spring 41 tending normally to slide 40 on part 39 against the tension of the test piece. The arrangement is such that the part 39 extends to the right of the spring, as viewed in Figs. 6, 10 and 11, while the part 40 which carries the bollard 3 extends to the left of the spring 41 and the spring is confined between these two parts.

Part 40 carries a latch 42 pivoted at 43 on said part 40 and having a leg 44 adapted to coact with a peg 45 on part 39 as described later. Said latch 42 coacts via a detent 46 with a pivoted bracket 47 which coacts via a detent 48 with a further tiltable bracket 49 to which is fixed the cursor switch 24. The brackets 47 and 49 are pivoted at 50 and 51, respectively, on part 39.

During a test the two parts 39 and 40 of the bollard nut are held together by the ring 1 under test which compresses the spring 41. When the test ring breaks, the spring extends and slides part 40 on part 39. This causes the latch 42, via the detent 46, to tilt the bracket 47 Fig. 13 so as to disengage the detent 48 as described later.

This allows the switch 24 to tilt so that the mercury flows from the contacts 27—26. Fig. 5, into the contacts 26—25, which de-energizes the forward solenoid 28 and energizes a reverse solenoid 52. This disconnects the drive from the pulley 35 and after the manner already described in connection with the forward motions, connects said drive to a pulley 53 which is driven by a crossed belt 54 from the countershaft 37.

Thus the motions of the apparatus effecting the test are automatically stopped and reversed, the bollard nut 5 moving backwards to re-set the apparatus, while the cursor and the pointer remain at the position to which they advanced, thereby leaving a held indication of the elongation and the load or tension at break.

The latch 42 moves first in a straight line Fig. 13 to tilt the bracket 47 to break the detent 48, the switch 24 then being held up by coaction of the leg 55, of the bracket 49 with a niche 56 in the bracket 47: the peg 45 then coacts with the leg 44 of the bracket 42 so as to tilt said bracket to break the detent 46 which is necessary for the following reason:—when the push button 18 is pressed to start the apparatus the leg 55 moves out of the niche 56 and the bracket 47 drops to remake the detent 48; if the detent 46 were not broken it would prevent this re-setting drop of the bracket 47.

Finally, that part of the bollard nut trip which coacts with the stopping trip comes into action as follows:—the stopping and starting switch 22 is mounted on a bracket 57 Figs. 14 and 16 controlled by a bracket 58 and leg 55' the arrangement being similar to that already described in connection with the cursor switch 24 less, of course, the latch 42. The brackets 57 and 58 are pivoted in fixed position relative to the stationary bollard 2, as for example by being journaled at 57' and 58' in a supporting bar 58.

When the nut 5 reaches the end of its reverse travel an extension 59, Figs. 7, 11, 12, 13, 14, 15 and 17, of the pivot 51 contacts a pin 60 protruding from the bracket 58 so as to tilt said bracket and thus allow the switch 22 to tilt so that the mercury flows out of the contact 61—62 and so cuts out both forward and reverse solenoids the friction clutch 8 then standing still between the two running pulleys 35 and 53; thus the motion of the moving bollard 3 is stopped.

The bollard nut is also run onto a plain part 63 Fig. 6 of the screwed shaft 6 and is spring loaded at 64 so as to tend normally into re-engagement with the screwed part.

Suppose now it is desired to carry out a test for load at a given elongation. The pointer 15 is again free on the load scale 16 the load trip 17 taking no part in this test. The cursor 10 is fixed on the scale 9, at the desired point of elongation thereon, as follows:—

On the cursor, there is a cranked lever 65 pivoted at 66 and having a leg 67 formed with a lip 68 adapted, when the lever 65 is in the position shown in Fig. 6, to engage with one of a number of notches 69 formed on the underside of the elongation scale 9 at given points of elongation.

Putting the lever 65 in this position, said lever being manipulated by the finger knob 70, also sets the cursor trip so that it will, at the appropriate time, coact with that part of the bollard nut trip which operates in connection with elongation tests, said cursor trip comprising on the lever 65 a further leg 71 formed with a stop 72.

The apparatus is set in motion as before so that the bollard nut 5 approaches the fixed cursor: when they meet as described later the cursor trip operates the said bollard nut trip to effect again the stopping and reversing motions aforesaid as follows:—

On the bracket 47, there is a peg 73 and when this meets the stop 72 said bracket 47 pivots and breaks the detent 48 which allows the switch 24 to tilt to reverse the drive as described before. Meantime, the pointer 15 has moved round the load scale 16 so that a held indication of the load or tension is given for a predetermined elongation.

Suppose now it is desired to carry out a test for elongation at a given load. This time, the cursor is free on the elongation scale the finger knob 70 having been moved to the other side: the cursor trip takes no part whatever in this test and the only part of the bollard nut trip which comes into operation is that part which controls the final stopping of the apparatus.

The pointer 15 is pushed by hand round the load scale 16 until it points to the load to which it is desired to submit the test ring, and said pointer is fixed to the scale at that point by means of a finger nut 74, see particularly Figs. 8 and 9 and 18–20. Doing this causes a cam 75, carried by the spindle 76 of the finger nut 74, to be turned and clamped into the position shown at Fig. 19.

The apparatus is set in motion as before and the bollard nut pushes the cursor freely along the elongation scale: the weight shaft 14 pivots under the influence of the pull on the weighted bollard 2 and causes the load trip to move round toward the pointer, as follows:—

The weight shaft 14 rotates through gearing 78, a spindle 79 to which is fixed an arm 80 which therefore moves commonly with the lifting weight. Fixed on the end of this arm 80 is a cradle 81, Figs. 9 and 18, in which a mercury switch 82, Figs. 8, 18 and 20, hereinafter called the load switch, is swung on horizontal pivots 82, Fig. 20. Pivoted at 83 on the arm 80 is a small lever 84, Figs. 18 and 19, forked at 85 to engage a pin 86 on the base of the switch 82.

The arm 80 moves around and brings the lever 84 into contact with the cam stop 75 and said lever thereupon tilts the load switch 82 so that the mercury flows out of the contact 87—88, Figs. 5 and 20 (which is energizing the forward solenoid 28), into the contact 88—89 which energizes the reverse solenoid 54 and this initiates the stopping and reversing motions aforesaid.

Meantime, the bollard nut has pushed the cursor along the elongation scale and so one gets a held indication of the elongation at a given load or tension.

When tests are being made which need the pointer 15 loose on the scale 16 the finger nut 74 is slacked off and this brings the cam 75 into position shown at 90 in Fig. 8: in these tests the pointer 15 is pushed round the scale by the driven arm 80 contacting a peg 91 on a member 92 which is in effect an integral part of the pointer 15.

As indicated in the foregoing, the test ring may be rotated during test so that all its parts receive the same treatment: in the preferred scheme the bollards are rotatably mounted and, as shown particularly in Fig. 7, the spindle 93 of the moving bollard 3 carries a pinion 94 which engages a fixed rack 97 so that said bollard rotates as it moves along the elongation scale.

Also as indicated in the foregoing, provision may be made to lower the weight gently instead of letting it fall freely and swing heavily to and fro, and in the preferred arrangement said provision is as follows, see particularly Figs. 1 to 4.

The weight shaft 14, which incidentally is connected to the weighted bollard 2 by means of a steel band 98, carries a worm wheel 99 freely rotatable thereon in a direction opposed to that in which the weight shaft pivots in lifting the weight. Said worm wheel is continuously driven while the apparatus is in motion via gearing 100 and a shaft 101 from the countershaft 37 aforesaid. Said worm wheel carries a ratchet wheel 102 around with it, the two being fixed together.

The support 103 for the weight on the weight shaft carries a pawl or pawls 104 which click idly round said ratchet wheel 102 as the weight lifts. When the ring breaks the weight tends to fall—in the same direction of rotation as the driven worm wheel 99. Thereupon, the pawls 104 operatively engage the ratchet wheel 102 and so the weight is operatively connected to the worm wheel 99 which then lowers said weight gently: when the weight gets to the bottom, the worm wheel simply rotates away and leaves it there.

The system is preferably spring loaded so as to cushion any shock, as shown in Figure 1, for example, the worm 105 which operates the worm wheel 99 may be slidably keyed on the shaft 101 so as to thrust against a compression spring 106.

It is not of course to be construed that we are confined to the details set out above as it will be apparent that this invention may be embodied in a variety of different ways.

And various refinement details may be incorporated as for example the moving bollard 3 may, see Fig. 7, contact the cursor not directly but through the engagement of a projecting stop 107 on the cursor and a pin 108, projecting from the pivot 50.

Having now particularly described said invention, we claim:—

1. Apparatus for testing tensile strength and extensibility which comprises a pair of separable test piece holding means, means to separate said holding means progressively, a driving means therefor, an electric circuit comprising an electromagnetic clutch to connect and disconnect said separating means to and from said driving means, manually operable means to energize said circuit, means actuated by one of said holding means when reaching a predetermined position to de-energize said circuit and terminate further movement, and means actuated by one of said holding means upon breakage of said test piece to de-energize said circuit and terminate further movement.

2. Apparatus for testing tensile strength and extensibility which comprises a pair of separable test piece holding means, means to separate said holding means progressively, reversing means to bring said holding means together, electric circuits to actuate said separating and said reversing means alternately including, adjustable means actuated automatically by one of said holding means to open said separating circuit and close said reversing circuit at a predetermined position, a manually operable switch to close said circuit actuating said separating means, and means operable by a holder at the end of the reverse movement to open said circuit.

3. Apparatus for testing tensile strength and extensibility which comprises a pair of separable test piece holding means, means to separate said holding means progressively, reversing means to bring said holding means together, electric circuits to actuate said separating and said reversing means alternately, a pair of switches arranged in series, one of said switches to open and close said separating and said reversing circuits alternately, the other switch serving to break said reversing circuit, means selectively and manually set so swing said first switch to close said separating circuit, means actuated by one holding means upon reaching a predetermined position to open said separating circuit and close said reversing circuit and means to swing the other of said two switches upon the end of said return stroke to open said reversing circuit.

4. Apparatus for testing tensile strength and extensibility which comprises a pair of separable test piece holding means, means for separating said holding means progressively, an electric circuit for controlling said separating means including an electric switch pivoted on one of said holders, trip mechanism for holding said switch, a release mechanism for said trip mechanism, means for placing said release mechanism under compression by the load applied on said holder during the test, said release means actuating said trip to swing said switch mechanism upon breakage of the test piece to open said circuit and stop further movement of said holder.

5. Apparatus for testing tensile strength and extensibility which comprises a pair of separable test piece holding means, means to separate said holding means progressively, an electric circuit comprising electric control means for said separating mechanism and a switch in said circuit pivoted on one of said holding means, a trip to hold said switch in position to close the control circuit, a release mechanism operable when the holding means carrying said switch reaches a predetermined point to release said trip and open said control circuit to stop further movement of said holding means.

6. Machine for testing extensible material which comprises means for stretching a test piece, electrically controlled means comprising a switch for stopping said stretching means, a loading means, means actuated by the said loading means comprising a movable arm carrying said switch, means carried by said arm to open said switch when stopped and an adjustable stop to stop said switch operating means at a set position.

7. Apparatus for testing extensible material which comprises means for stretching said material under tension, means for indicating said tension, means for measuring and indicating the elongation of said extensible material, means for stopping said stretching means, said stretching means comprising a tensioning member which is movable to tension and stretch said extensible material and a relatively stationary member which is movable to a limited extent by the tension imposed on said extensible material, a givable resistance acting on said member of limited movement reacting against the tension of said extensible material, means operated by the said tensioning moving member upon reaching a predetermined position to reverse the tensioning movement of said member and comprising a stop and a trip mechanism on said movable member to engage said stop.

8. Apparatus for testing extensible material which comprises means for stretching said material under tension, means for indicating said tension, means for measuring and indicating the elongation of said extensible material, means for stopping said stretching means, said stretching means comprising a tensioning member which is movable to tension and stretch said extensible material and a relatively stationary member which is movable to a limited extent by the tension imposed on said extensible material, a givable resistance acting on said member of limited movement reacting against the tension of said extensible material, means operated by the said tensioning moving member upon reaching a predetermined position to reverse the tensioning movement of said member and comprising a stop and a trip mechanism on said movable member to engage said stop, an elongation indicating scale and cursor, means to set said stop by anchoring said cursor to said scale, said trip comprising a system of pivoted brackets carried by the tensioning movable member and movable into the path of said stop.

HARRY WILLSHAW.
GEOFFREY CHARLES BRENTNALL.